P. H. VAN DER WEYDE.
Percolator.
No. 53,905.
Patented April 10, 1866.
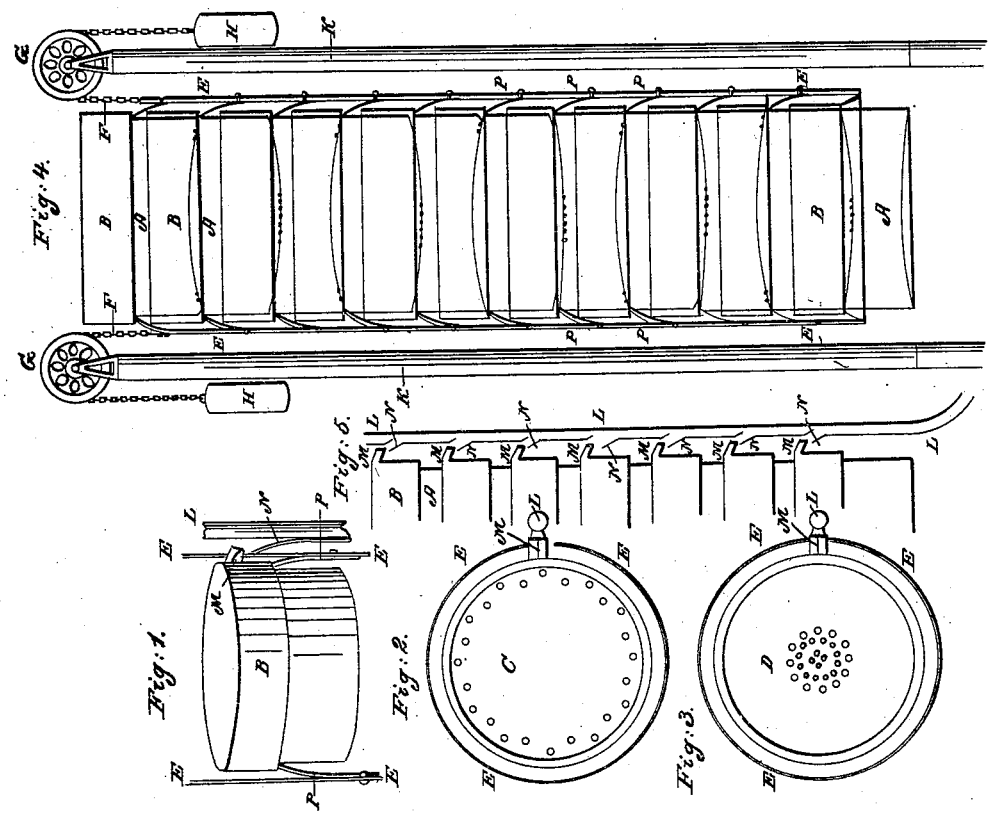
Witnesses:
Wm Robenson
H. Erni
Inventor:
P.H. Van der Weyde

UNITED STATES PATENT OFFICE.

P. H. VAN DER WEYDE, OF PHILADELPHIA, PENNSYLVANIA.

IMPROVED PERCOLATOR.

Specification forming part of Letters Patent No. 53,905, dated April 10, 1866.

*To all whom it may concern:*

Be it known that I, PETER HENDRIK VAN DER WEYDE, of the city and county of Philadelphia, State of Pennsylvania, have invented an Improved Percolator and Filtering-Machine, the purpose of which is to economize time and material, of which the following is a specification.

The economy of time is obtained by arranging the machine in such a way that its function is continual, without the interruption caused in following the old method of clearing the filter or percolator entirely out and filling it anew.

The economy of material is obtained by causing all the parts of the solid substance of which an extract is made, or which is used for filtering, to come in its time to the top. The top layer being the only one which, by the action of the fresh fluid, has become exhausted, an enormous waste of solid material is experienced by the old way of filtering, where the bottom layers are not sufficiently acted upon by the liquid, which is so much changed by the action of the upper layers that it has lost its capacity to act upon or to be acted upon by the lower layers. For instance, in making colored extracts from dye-woods or dissolving sulphate of copper or iron from the wasted sulphurets only the upper layers become entirely deprived of the soluble material, as they are the only ones coming in contact with the pure water. This water, being more or less saturated before coming in contact with the lower layers, is not able to dissolve all that is soluble in them, causing a waste in the lower layers of twenty to fifty per cent., it taking too great a quantity of water to exhaust them entirely, the upper portions passing through, being too much diluted to make it an object to continue the operation. I am aware that it is customary to pass this diluted liquid several times through fresh portions of material. Thus a part of the waste is economized. However, it is done in a slow and imperfect manner.

In the discoloring of cane-sugar sirup by means of animal-charcoal from ten to twenty per cent. only of the discoloring power of the charcoal is used, according to the statements obtained from the ablest sugar-refiners. This is also caused by the fact that in their columns of bone-black, thirty feet high, only the upper layer of one foot thickness is about exhausted in its power, being the only part of the whole column coming in contact with the impure sirup. As soon as the sirup running out below commences to be too much colored the whole column has to be emptied and renewed, notwithstanding still ninety per cent. of its power of absorbing coloring-matter is left. I am aware that also in this case the liquid is sometimes passed through several columns of bone-black. However, it is again done imperfectly and at a great loss of time and labor.

My invention consists in dividing the column of crushed material in horizontal layers of, say, one foot in thickness by placing it in boxes with perforated bottoms, placing these boxes one on the top of the other, and passing the liquid successively through them all. It is clear that the upper one will be exhausted first, which will be perceptible in the case of the percolator by greater dilution of the liquid passing out below, and in case of filtering by the slightly impurer appearance of this liquid. The upper box is then removed and a fresh one is added, not at the top, but from below. The most exhausted solid parts will thus continually be removed from the top and fresh material added from below, so that the almost perfect liquid will pass through the freshest layer of solid substance. After some experience as to the time necessary for this, the operator need not wait till the liquid changes, but supplies the boxes with fresh material at regular intervals. It is therefore clear that in proportion that the liquid is running downward we must cause the filtering substance to move upward against this current, and the problem to accomplish this is one of a mechanical nature, of which we give here the description, referring to the annexed drawings.

Figure 1 is a perspective view of one of the boxes, one foot eight inches high and two and a half feet in diameter. The part A, one foot high, is of a few inches lesser diameter in order to fit in the part B of the box below, like B receives the part A of the upper box. Fig. 2 shows the bottoms of the first, third, fifth, and seventh boxes. Fig. 3 shows the bottoms of the second, fourth, sixth, and eighth boxes.

The reason of making the perforation alternately at the circumference and center of these boxes, and of making the bottoms alternately convex and concave, is to secure with more certainty that the liquid will penetrate all parts of the material in the boxes, which will in this case receive in the center and discharge at the circumference or receive at the circumference and discharge at the center. These small holes are all of the same size, and each box contains the same number of them in order to secure an equal flow through all. However, to provide against an accidental slower flow through one box, and consequent overflow, each box is provided with a beak, M, Fig. 1, directing the overflowing liquid in a separate tube, L. This tube serves for the overflow of any box. (See Fig. 5.)

The mechanism by which all the boxes are slowly elevated, in order to place a fresh one under them, is represented partially in Fig. 4.

E E E is a hollow cylinder, of nearly two feet eight inches diameter, surrounding all the boxes, and having the same height as the pile of boxes to be used—that is, for instance, for twenty boxes it will be twenty feet high. This cylinder is, inside, provided with springs P, three for each box, which, always tending to bend inward, will catch under the upper wider part, B, of the box, like the cog in the teeth of a wheel, (represented in Fig. 1,) so that, having placed a new box underneath and moving this cylinder downward, the boxes will stand on one another and no more be supported by the springs or cogs. These will slip downward till reaching the next box, and be able to lift them all up again till there is place for another box. This hollow cylinder is counterbalanced by the weights H by means of chains F passing over pulleys G G, supported by walls or beams K K. This cylinder E E E has a slit, through which the overflow-tube M projects, (not represented in Fig. 4, but shown in Figs. 2, 3, and 5,) discharging this occasional overflow in the tube L, provided with springs and projecting slightly over the overflow-pipe M. There is also provided the means of diminishing the flow of any one box by a sliding piece closing some or all the holes in the bottom, or by stop-cocks in a second bottom below the perforated one, all worked by a rod passing out of the exit-tube M. This serves the double purpose of retarding the flow, if desired, to keep the liquid longer in contact with the solid, and in case of overflow to retard or stop the supply from above.

When this percolator is used for filtering purposes the boxes may be filled with any of the common filtering materials, as bone-black or animal-charcoal, &c. I have, however, found a cheap substitute for this substance, consisting of wood-charcoal, first permeated by a solution of chloride of calcium, dried by heat, then treated by dilute phosphoric acid and dried again; then I solidify and fix the lime and form an artificial phosphate of lime in the carbon, making it similar in some of its properties to natural bone-black. I found also great advantages in mixing this charcoal with carbonate of magnesia or lime, or both.

When this apparatus is made on a large scale it will be well to have the weight H much heavier than the cylinder E E E, so much that the same power is required to move it downward without the boxes as to move it upward with them. A small steam-engine may then very slowly produce an up-and-downward motion, of which the velocity may be regulated by the time required to supply fresh material.

The upper box, when taken out, is set to be drained, and its material washed out when used for filtering purposes.

What I claim as my invention, and wish to secure by Letters Patent, is—

1. The method herein described for making extracts and for filtering purposes, which consists in dividing the column or vessel to contain the material to be extracted or filtered into a series of horizontal layers or divisions, which, by suitable mechanical means, may be moved upward so as to allow the addition of fresh material to the bottom and its removal from the top when exhausted, substantially as described.

2. The manufacture of artificial bone-black from wood-charcoal, and its use for filtering purposes, either alone or mixed with compounds of lime or magnesia.

P. H. VAN DER WEYDE, M. D.

Witnesses:
 WM. ROBINSON,
 A. L. FLEURY.